United States Patent [19]
Olds et al.

[11] Patent Number: 5,669,062
[45] Date of Patent: Sep. 16, 1997

[54] METHODS OF DEMAND-BASED ADAPTIVE CHANNEL REUSE FOR TELECOMMUNICATIONS SYSTEMS

[75] Inventors: Keith A. Olds; Victor H. Cutler, Jr., both of Mesa, Ariz.; Gerald J. Davieau, Eldersburg, Md.

[73] Assignee: Motorola, Inc., Schaumburg, Ill.

[21] Appl. No.: 709,927

[22] Filed: Sep. 9, 1996

Related U.S. Application Data

[63] Continuation of Ser. No. 329,926, Oct. 27, 1994, abandoned.
[51] Int. Cl.⁶ .............................. H04B 7/26; H04B 7/185; H04Q 7/36
[52] U.S. Cl. ........................... 455/509; 455/12.1; 455/62; 455/63
[58] Field of Search ..................... 455/12.1, 13.1, 455/33.1–33.4, 34.1, 34.2, 52.2, 52.3, 54.1, 54.5, 62, 63; 379/59, 60

[56] References Cited

U.S. PATENT DOCUMENTS

| | | |
|---|---|---|
| 4,736,453 | 4/1988 | Schloemer . |
| 5,203,012 | 4/1993 | Patsiokas et al. ............ 455/34.1 |
| 5,345,597 | 9/1994 | Strawczynski et al. ....... 455/34.1 |
| 5,437,054 | 7/1995 | Rappaport et al. ........... 455/34.1 |
| 5,448,621 | 9/1995 | Knudsen ......................... 455/33.1 |

OTHER PUBLICATIONS

Patrick L. Reilly, Ph.D., "Dynamic Channel Assignment Strategies In A Microcellular System", Apr. 14, 1992, presented at the SABA Microcellular Symposium, Schaumburg, IL., pp. 1–6.

*Primary Examiner*—Chi H. Pham
*Attorney, Agent, or Firm*—Harold C. McGurk

[57] ABSTRACT

Methods efficiently assign user channels in a LEO (low-earth orbit) telecommunication system. These methods adapt the channel reuses based on system load or demand. These methods achieve high capacity and minimize interference for the particular situation. Since these methods are adaptive, they adjust to maintain efficient operation as the load conditions change.

16 Claims, 5 Drawing Sheets

METHODS OF DEMAND-BASED ADAPTIVE CHANNEL REUSE FOR TELECOMMUNICATIONS SYSTEMS

This application is a continuation of prior application Ser. No. 08/329,926, filed Oct. 27, 1994 now abandoned.

TECHNICAL FIELD

This invention relates generally to telecommunication systems and, in particular, to methods for managing and reusing channels in a telecommun-ication system based on interference potential.

BACKGROUND OF THE INVENTION

In terrestrial-based cellular systems, channel assignments are made within fixed frequency reuse cell clusters. A cluster comprises a set of predetermined cells which are adjacent to each other. That is, each cell within a predetermined cluster is given a unique set of orthogonal channels so that channels within a cluster do not interfere with one another. Outside of the cluster, the channels are reused. The reuse between clusters follows a fixed pattern designed to minimize interference between the clusters.

The reuse cluster technique associated with terrestrial-based cellular systems is difficult to implement when the cellular base stations are replaced by satellites in a low-earth orbit (LEO). Time division multiplex access (TDMA) and frequency division multiple access (FDMA) communication systems and systems that use similar channel structures avoid excessive interference by assigning traffic channels that do not conflict with other traffic channels in time or frequency. The channel assignment problem is exacerbated when one end of the communication system is located at the LEO satellites where differential Doppler shifts and differential propagation times can cause transmissions between a user and a satellite to interfere with channels on another satellite. This problem becomes even more severe when earth terminals or stations can transmit and receive over large coverage angles that may include several satellites.

Accordingly, there is a significant need for methods which efficiently use the available frequency spectrum without interfering with other channels.

BRIEF DESCRIPTION OF THE DRAWINGS

The invention is pointed out with particularity in the appended claims. However, other features of the invention will become more apparent and the invention will be best understood by referring to the following detailed description in conjunction with the accompanying drawings in which:

DESCRIPTION OF THE PREFERRED EMBODIMENTS

The present invention involves methods for managing and reusing channels based on adaptive rules. The methods may predict the reuse channels or may operate in real-time. The adaptive rules help to determine the highest capacity at the lowest interference that is possible for a particular user demand situation. The basic concept is to match the reuse factor to the actual demand at a particular time and place. In accordance with a preferred embodiment, a user accesses the system and requests a channel assignment. Next, the system searches through all unused channels and checks the interference potential of each available channel against all channels that are already assigned. Finally, the system assigns the channel with the lowest interference potential.

A "satellite" means a man-made object or vehicle intended to orbit a celestial body such as the earth. The term "satellite" is intended to include both geostationary and orbiting satellites and/or combinations thereof including low-earth orbiting (LEO) satellites. The word "earth" is intended to include any celestial body around which a communication satellite may orbit. A "constellation" means an ensemble of satellites arranged in orbits for providing specified coverage (e.g., radio communication, photogrammetry, etc.) of portion(s) or all of the celestial body. A constellation typically includes multiple rings (or planes) of satellites and may have equal numbers of satellites in each plane, although this is not essential. The terms "cell" and "antenna pattern" are not intended to be limited to any particular mode of generation and include those created by either terrestrial or satellite cellular telecommunication systems and/or combinations thereof.

Figure 1:
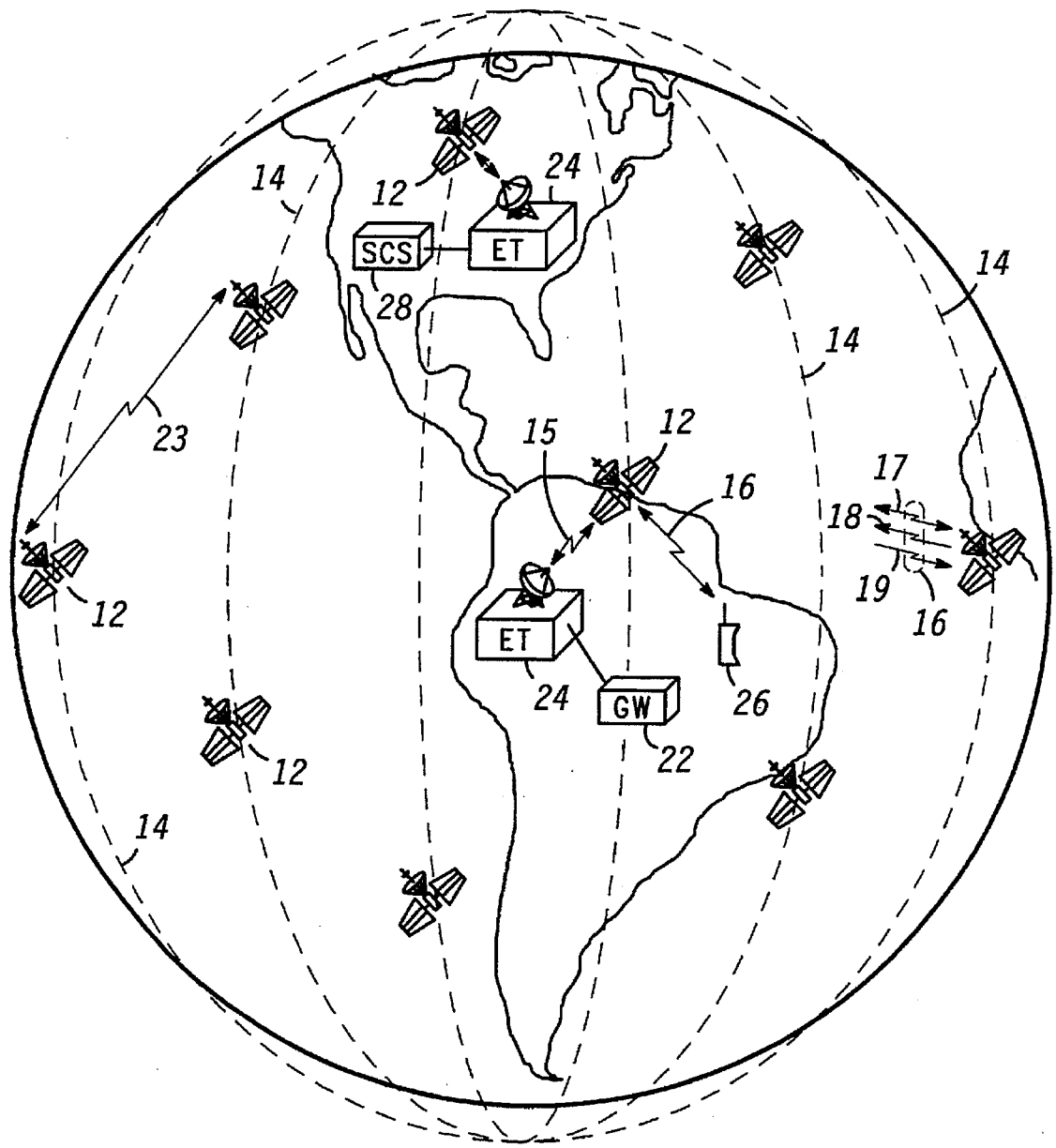
FIG. 1 depicts a highly simplified diagram of a satellite-based telecommunication system of which the present invention may form a portion thereof.

FIG. 1 illustrates a highly simplified diagram of satellite-based telecommunication system 10, dispersed over and surrounding earth through use of orbiting satellites 12 occupying orbits 14. The present invention is applicable to telecommunication systems including satellites having low-earth and medium-earth orbits. Additionally, it is applicable to orbits having any angle of inclination (e.g., polar, equatorial or another orbital pattern).

Communication system 10 uses six polar orbits 14, with each orbit 14 having eleven satellites 12 for a total of sixty-six satellites 12. Although this is preferred, it is not essential because more or fewer satellites, or more or fewer orbits, may be used. While the present invention is advantageously employed when a large number of satellites are being used, it is also applicable with as few as a single satellite. For clarity, FIG. 1 illustrates only a few of satellites 12 of the constellation.

For example, each orbit 14 encircles earth at an altitude of around 785 km, although higher or lower orbital altitudes may be usefully employed. Due to the relatively low orbits of satellites 12, substantially line-of-sight electromagnetic (e.g., radio, light etc.) transmission from any one satellite 12 or reception of signals by any one satellite 12 covers a relatively small area of earth at any instant. For the example shown, satellites 12 travel with respect to earth at around 25,000 km/hr, allowing satellite 12 to be visible to a terrestrial station or ISUs 26 for a period of approximately nine minutes.

Satellites 12 communicate with terrestrial stations which may include some number of radio communication individual subscriber units (ISUs) 26 and earth terminals (ETs) 24 connected to system control segment (SCS) 28. ETs 24 may also be connected to gateways (GWs) 22 which provide access to a public switched telephone network (PSTN) or other communications facilities. Only one each of GWs 22, SCSs 28 and ISUs 26 are shown in FIG. 1 for clarity and ease of understanding. ETs 24 may be co-located with or separate from SCS 28 or GW 22. ETs 24 associated with SCSs 28 receive data describing status of satellites 12 and GWs 22 and relay packets of control information. ETs 24 associated with GWs 22 primarily receive and relay packets relating to calls in progress from/to ISUs 26 and satellites 12.

ISUs 26 may be located anywhere on the surface of the earth or in the atmosphere above the earth. ISUs 26 are preferably communications devices capable of transmitting data to and receiving data from satellites 12. By way of example, ISUs 26 may be hand-held, portable cellular telephones adapted to communicate with satellites 12. Ordinarily, ISUs 26 need not perform any control functions for communication system 10.

Communication system 10 may accommodate any number, potentially in the millions, of ISUs 26. In the preferred embodiments of the present invention, ISUs 26 communicate with nearby satellites 12 via subscriber links 16. Links 16 encompass a limited portion of the electromagnetic spectrum that is divided into numerous channels. Links 16 are preferably combinations of L-Band and/or K-Band frequency channels and may encompass Frequency Division Multiple Access (FDMA) and/or Time Division Multiple Access (TDMA) and/or Code Division Multiple Access (CDMA) communications or combinations thereof. At a minimum, satellite 12 regularly transmits over one or more broadcast channels 18. ISUs 26 synchronize to broadcast channels 18 and monitor broadcast channels 18 to detect data messages which may be addressed to them. ISUs 26 may transmit messages to satellites 12 over one or more acquisition channels 19. Broadcast channels 18 and acquisition channels 19 are not dedicated to any one ISU 26 but are shared by all ISUs 26 currently within view of a satellite 12.

On the other hand, traffic channels 17 are two-way channels that are assigned to particular ISUs 26 by satellites 12 from time to time. In the preferred embodiments of the present invention, a digital format is used to communicate data over channels 17-19, and traffic channels 17 support real-time communications. At least one traffic channel 17 is assigned for each call, and each traffic channel 17 has sufficient bandwidth to support, at a minimum, a two-way voice conversation. To support real-time communications, a time division multiple access (TDMA) scheme is desirably used to divide time into frames, preferably in the 10-90 millisecond range. Particular traffic channels 17 are assigned particular transmit and receive time-slots, preferably having durations in the 3-10 millisecond range, within each frame. Analog audio signals are digitized so that an entire frame's signal is transmitted or received in a single short high speed burst during an allotted time-slot. Preferably, each satellite 12 supports up to a thousand or more traffic channels 17 so that each satellite 12 can simultaneously service a number of independent calls. Those skilled in the art, however, will recognize that traffic channels can be formed without this time slot structure and that methods that do not require digitizing the analog voice signal may be employed. The precise method used to form the channels and process the voice communication is not important to this invention.

Satellites 12 communicate with other nearby satellites 12 through cross-links 23. Thus, a call or communication from an ISU 26 located at any point on or near the surface of the earth may be routed through the constellation of satellites 12 to within range of substantially any other point on the surface of the earth. A communication may be routed down to an ISU 26 on or near the surface of the earth from a satellite 12 using subscriber link 16. Alternatively, a communication may be routed down to or up from any of many ETs 24, of which FIG. 1 shows only two, through earth links 15. ETs 24 are usually distributed over the surface of the earth in accordance with geo-political boundaries. In the preferred embodiments, each satellite 12 may communicate with up to four ETs 24 and over a thousand ISUs 26 at any given instant.

SCS 28 monitors the health and status of system communication nodes (e.g., GWs 22, ETs 24 and satellites 12) and desirably manages operations of communication system 10. One or more ETs 24 provide the primary communications interface between SCS 28 and satellites 12. ETs 24 include antennas and RF transceivers and preferably perform telemetry, tracking and control functions for the constellation of satellites 12.

GWs 22 may perform call processing functions in conjunction with satellites 12 or GWs 22 may exclusively handle call processing and allocation of call handling capacity within communication system 10. Diverse terrestrial-based communication systems, such as the PSTN, may access communication system 10 through GWs 22.

With the example constellation of sixty-six satellites 12, at least one of satellites 12 is within view of each point on the earth's surface at all times, resulting in full coverage of the earth's surface. Any satellite 12 may be in direct or indirect data communication with any ISU 26 or ET 24 at any time by routing data through the constellation of satellites 12. Accordingly, communication system 10 may establish a communication path for relaying data through the constellation of satellites 12 between any two ISUs 26, between SCS 28 and GW 22, between any two GWs 22 or between ISU 26 and GW 22.

The present invention is also applicable to satellite constellations where full coverage of the earth is not achieved (i.e., where there are "holes" in the communications coverage provided by the constellation) and constellations where plural coverage of portions of the earth occur (i.e., more than one satellite is in view of a point on the earth's surface).

In general terms, communication system 10 may be viewed as a network of nodes. Each satellite 12, GW 22, and ISU 26 represents a node of communication system 10. All nodes of communication system 10 are or may be in data communication with other nodes of communication system 10 through communication links 15, 16, and/or 23. In addition, all nodes of communication system 10 are or may be in data communication with other telephonic devices dispersed throughout the world through PSTNs and/or conventional terrestrial cellular telephone devices coupled to the PSTN through conventional terrestrial base stations.

Figure 2:
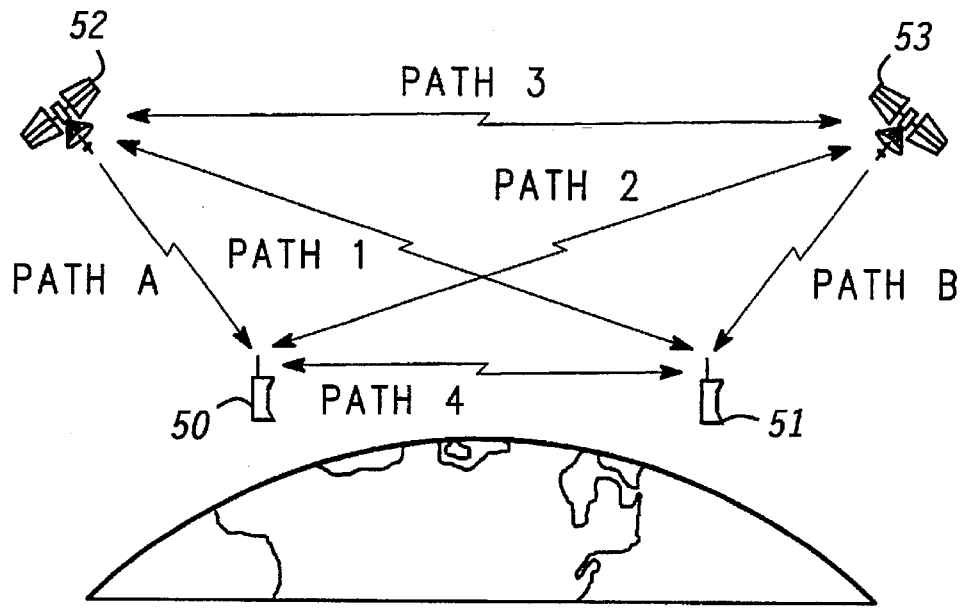
FIG. 2 depicts a satellite interference scenario.

FIG. 2 illustrates potential interference paths that can occur in a satellite telecommunication system. Paths A and B are the desired signal paths between subscriber units 50 and 51 and satellites 52 and 53, respectively. In this example, subscriber unit 50 and satellite 52 are synchronized so that transmissions from subscriber unit 50 arrive at satellite 52 during the correct receiver window for the assigned channel and visa versa. Satellite 53 is at a different distance from subscriber unit 50 than satellite 52 and is moving at a different velocity relative to subscriber unit 50 than satellite 52.

There is generally a different propagation delay and Doppler frequency shift between satellite 53 and subscriber unit 50 than there is between satellite 52 and subscriber unit 50. Any interference that reaches satellite 53 from subscriber unit 50 may not be in the time slot and frequency access that corresponds to the user channel of subscriber unit 50. The interference may have "slid" into a different channel. If this second channel has been assigned to subscriber unit 51, unacceptable interference will result. Thus, even if channels are only used once, channels from one station may interfere with channels from a different station in a dynamic system.

Figure 3:
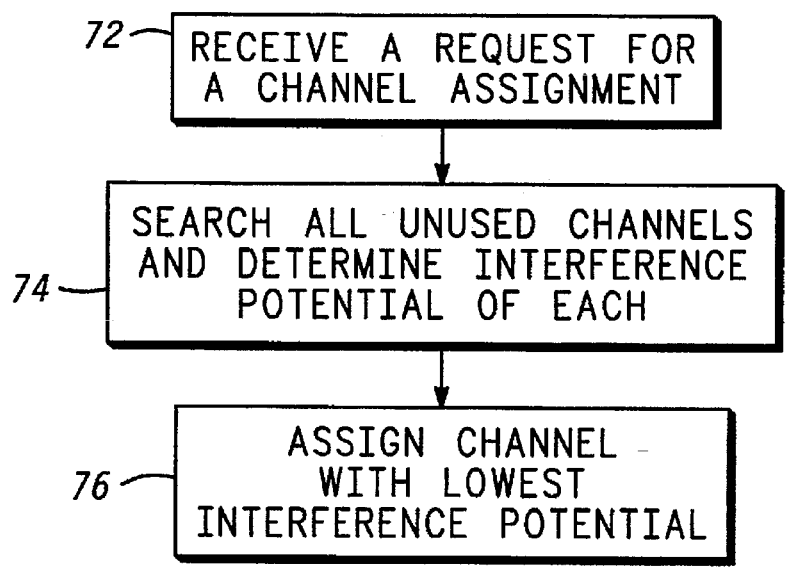
FIG. 3 shows a method for matching the managing and reusing channels in accordance with a preferred embodiment of the present invention.

The method of the preferred embodiment of the invention is to match the reuse factor to the actual demand at a particular time and place. FIG. 3 shows a channel management and reuse method 70 in accordance with a preferred embodiment of the present invention. Channel management and reuse method 70 is preferred executed by a computer on-board the satellite or by the SCS. As shown in FIG. 3, a user (e.g., a subscriber unit or an earth terminal) accesses the system and requests in step 72 an assignment of a channel. Next, method 70 searches in step 74 through all unused channels and checks the interference potential of each available channel against all channels that are already assigned. Method 70 then assigns in step 76 the channel with the lowest interference potential.

Figure 4:
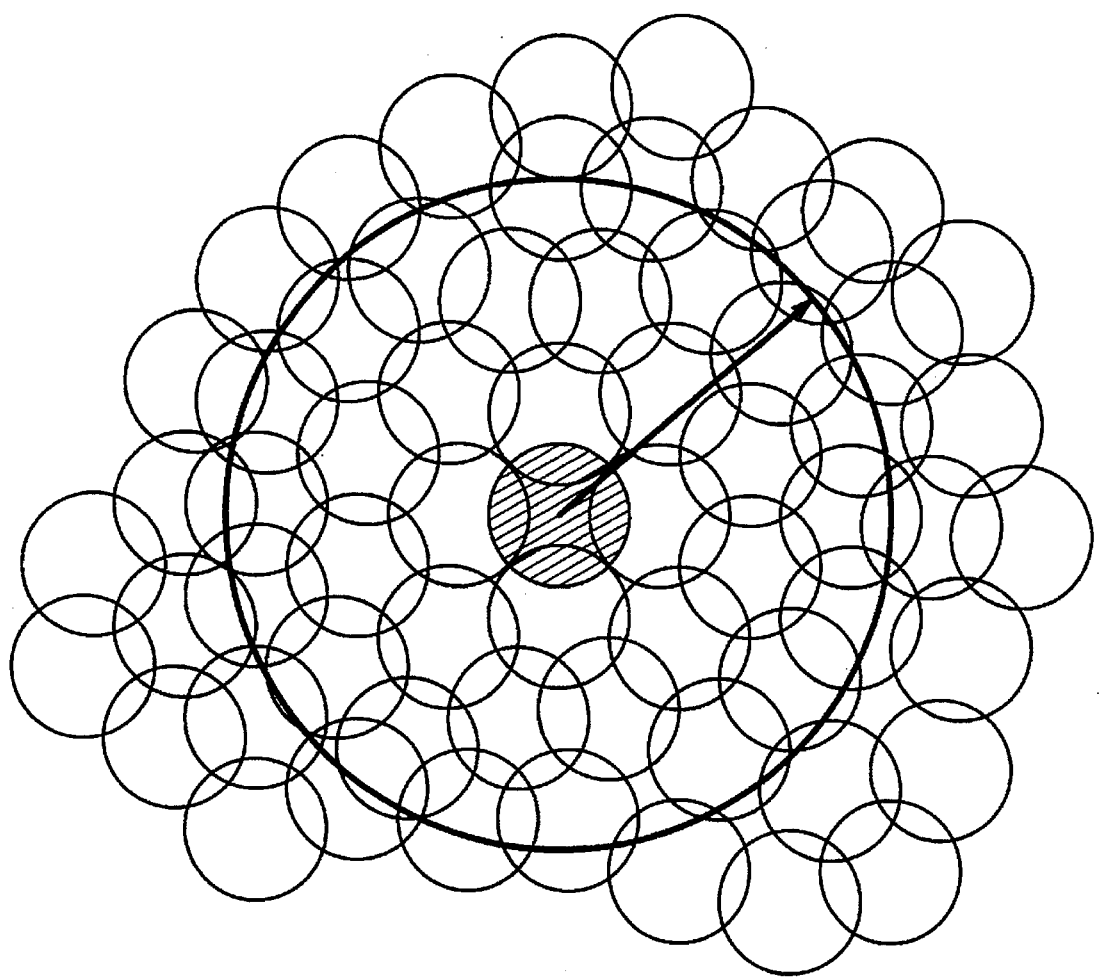
FIG. 4 depicts a cellular telecommunication system cell map and a shaded cell requiring more capacity.

There are several variations on the fundamental method. For example, the search can be terminated as soon as a channel is found that meets minimum interference criterion, instead of searching all channels and taking the channel with the lowest interference. As an example, if the number of active users were low in a particular geographical area, the minimum interference criterion would be satisfied if the channels which are able to produce interference are used over the radio horizon. In this case, referring to FIG. 2, paths 1 and 2 would not exist because the surface of the earth would prevent electromagnetic energy emitted from either end of the path from reaching the subscriber unit or the satellite. By prior calculation, there may exist a relationship between distance and the amount of interference anticipated. If this exists, then distance measured in the radius shown in FIG. 4, is used as a surrogate for a direct measurement or calculation of the interference.

Another modification would be to insist that the minimum interference criterion be met before any channel is assigned. If no channel meets this criterion, the user is denied access to the communication system. A further modification would be to determine an anticipated demand for a duration of a planning interval by searching through all unused channels and checking interference potential of each unused channel against all channels that are already assigned. The channel with the lowest interference potential would be allocated to the channel within which a demand is expected. Finally, the satellites, the location of the subscriber units, and the interference sources would be propagated in time to create a preplanned allocation of channels with minimum interference potential.

Assigning channels based on minimum interference potential results in adapting the amount and location of channel reuse so that it causes the minimum interference for the current demand and user distribution. This is a great advantage over fixed reuse patterns that place all reused channels at as high an interference level as the design limit allows. Fixed patterns tend to cause users to have relatively high interference even though the system is lightly loaded and excess capacity is available. In addition, since fixed reuse patterns must be based on worst case assumptions about the distribution of users that might interfere with one another, the capacity of the system is artifically limited for many actual user distributions.

The methods that implement the adaptive reuse concept basically operate by searching through the space of available channels and selecting an optimum combination of channels that service the demand with minimal interference. To accomplish this, the method predicts the interference that would result from a particular combination of channels. The method also searches the available channel space by incorporating knowledge about what factors reduce and increase interference.

There are four basic system parameters that help to predict interference between channels in a FDMA/TDMA system: sparing between channel reuses, differential time of arrival from more than one source (time slide), differential Doppler or perceived frequency of arrival (frequency slide), and antenna pattern. An adaptive reuse method restricts interference by controlling one or more of these parameters. These parameters are discussed in greater detail below.

Spacing between channel reuses involves the physical space between interfering subscriber units. If reused channels can be physically separated so that any possible subscriber receiver falls beyond the radio horizon of a potentially interfering transmitter, no interference is possible. When the interferer is brought closer to the other subscriber unit, the interference potential increases.

As explained above in the discussion of FIG. 2, when a subscriber unit is synchronized to a satellite, it may interfere with a different channel projected by the second satellite because the propagation delay from the subscriber unit to the second satellite is different from the delay between the subscriber unit and the first satellite. This differential propagation delay causes energy from the subscriber unit to "slide" into the time slot of the victim channel. This is known as a time slide.

For time slide to occur, the interfering and victim channels must use the same frequency access and be in adjacent or nearly adjacent time slots. When the time separation between the two channels is greater than the maximum propagation time difference from a subscriber unit to a satellite directly overhead and from a subscriber unit to a satellite at the horizon, interference due to time slide is impossible.

Differential Doppler shifts between a subscriber unit and two satellites create interference in essentially the same manner as differential propagation delay. In this case, however, the interfering channel is in the same time slot as the victim channel, and the Doppler shift causes the interfering energy to slide into a nearby frequency access. When the two channels are separated in frequency by greater than twice the maximum Doppler shift between a satellite and a subscriber unit, interference due to frequency slide is not possible.

Note that a combination of time and frequency slide may cause interference between two channels that are not on either the same frequency access or in the same time slot. The time separation and frequency separation conditions from avoiding interference may apply for this combined case as well as for the pure time slide or pure frequency slide cases.

Interference between channels is only possible when energy from an interfering channel transmitter is radiated toward a victim channel receiver. LEO satellites generally use spot beam antennas to direct the uplink and downlink channels into particular areas on the earth's surface. The relative locations of channels assignments can be controlled so that the transmitter and receiver antenna patterns prevent potentially interfering channels from receiving significant power from each other.

In addition to these controllable parameters, the interference experienced by a LEO system is also a function of environmental factors that the system cannot control. The major environmental effects comprise for example, multipath reflections and shadowing due to obstructions in the radio propagation paths. These environmental factors result in time-varying fading of the signal at a system receiver. Since different transmissions will encounter different fading levels, an interfering signal may actually have a propagation loss advantage relative to the victim signal. Environmental factors of this kind cannot be controlled by the system, but can be included in the interference prediction part of the adaptive reuse method.

In order to avoid excessive system self-interference, subscriber units or users must be continuously separated from other users operating nearby spatially and in time and/or frequency. For avoiding self-interference, it is desirable to physically separate users with the same time and frequency assignments by a large distance. To maximize system capacity, it is desirable for the same users to be as physically close together as possible. The method adaptively performs this trade-off, keeping users very far apart when system loading is light. When the demand on the system increases, the method permits assignments to be made close together, but only as close as dictated by the demand. Finally, there is a floor on user separation which blocks users from the system rather than permit system self-interference to reach unacceptable levels. The method thus maintains the highest possible quality of service given the demand on the system.

FIG. 4 depicts a section of a cell map for a cellular telecommunication system. Each circle represents a cell which is assigned units of capacity which may be defined in terms of time separation (TDMA), frequency separation (FDMA), code separation (CDMA), or any combination of these methods. Since the method is not dependent on the specific way used to separate users, a "reuse unit" is defined as some unit of capacity which is to be assigned either to a cell or to an individual subscriber unit within the cell. It is these reuse units which are physically separated in order to avoid interference.

As shown in FIG. 4, the system requires more capacity in the shaded cell. Each of the cells surrounding the shaded cell is carrying traffic to some degree, and therefore have already been assigned a number of reuse units. The goal is to assign a reuse unit to the shaded cell to carry the traffic demand while minimizing the mutual self-interference incurred from the new assignment.

Figure 5:
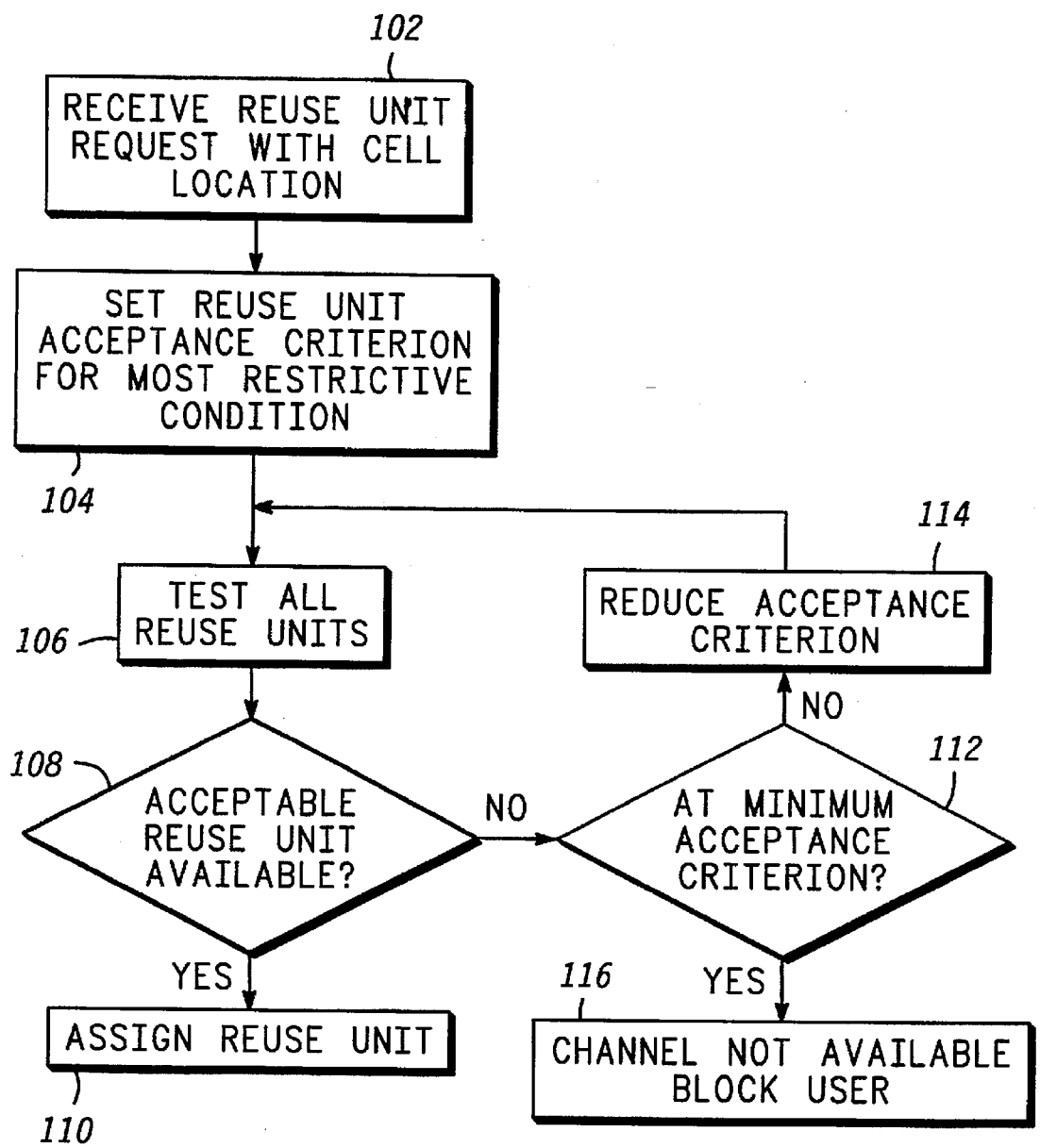
FIG. 5 shows a maximum distance method for reusing channels in accordance with a preferred embodiment of the present invention.

One of the methods for managing and reusing channels in accordance with a preferred embodiment of the present invention is shown in FIG. 5. Briefly, this method uses an iterative "maximum distance" search in which it initially attempts to assign a new user to a channel for which all currently active channels that potentially interfere are beyond the radio horizon of the cell in which the new user is located. If this fails, the allowable distance for an interfering channel is reduced and another attempt is made to find an available channel for the new user. This search is repeated for smaller allowed separation between the new channel and potential interfering channels until an available channel is located.

As shown in FIG. 5, method 100 begins in step 102 by receiving a reuse unit request from a subscriber unit. In step 104, method 100 sets reuse unit acceptance criterion for a most restrictive condition. This may involve, such as shown in FIG. 4, drawing a "large" radius circle centered from the center of the shaded cell. ("Large" is defined as a distance so big that identical reuse unit assignments physically separated by that distance will incur negligible mutual interference.) The region within the circle will be referred to as the "exclusion zone".

Method 100 then tests in step 106 all reuse units and determines in step 108 whether an acceptable reuse unit is available. For example, method 100 examines the entire list of reuse units available to the system as candidates for addition to the shaded cell. A candidate reuse unit may only be used in the shaded cell if no cell whose center lies within the exclusion zone is already using that reuse unit. If such a reuse unit can be found, method 100 will assign it to the shaded cell. If an acceptable reuse unit is found, the subscriber unit is assigned the reuse channel in step 110.

Otherwise, method 100 determines in step 112 whether the criterion is at the minimum distance or acceptance level. If no such cell can be found, method 100 reduces in step 114 the radius of the exclusion zone by some suitable factors and repeats steps 106, 108 and 112. For example, if such a reduction in the exclusion zone would put the radius below the minimum radius required to maintain system quality of service, then the shaded cell cannot be assigned the additional capacity and method 100 blocks users from entry into the system in step 116. Method 100 repeats steps 106, 108, 112 and 114 until an acceptable reuse channel is found, or until a channel is found not to be available and the subscriber is blocked from establishing telecommunication in step 116.

Note that method 100 maintains the largest possible physical separation between users having the same reuse unit, given the current system loading level. This permits very high quality of service in lightly loaded areas, with optimal system performance maintained right down to the minimum acceptable quality of service defined by the reuse distance floor as loading levels increase.

There are variants on the basic method shown in FIG. 3. It is possible that varying propagation delays and Doppler shifts between a user and multiple satellites will cause even different reuse units to interfere. (This is referred to as "loss of orthogonality" between reuse unit.) The basic algorithm is easily extended to take this loss of orthogonality into account. For example, if a reuse unit A may interference with reuse units B and C due to differential delay or Doppler, then one of the variation of method 100 is to modify step 106 to disallow the reuse units B and C within the exclusion zone in addition to reuse unit A.

Another variation is to modify the rules defining the exclusion zone from a simple circle with a given radius to cells which take into account the directional antenna isolation offered by the system antennas. The exclusion zone would then be defined as the region where all cells within the region provide a signal strength at the center of the shaded cell in excess of some threshold. The signal strength threshold would then be varied in the same way as the exclusion zone radius was varied in step 108 of method 100 shown in FIG. 5.

Another modification of method 100 is to add a minimum distance requirement when testing for acceptable reuse units in step 108 of method 100. If the search fails to find a suitable channel beyond the minimum distance, the user is denied access to the system. An additional modification of step 108 of method 100 is to allow less separation in areas where the antenna patterns provide more isolation between potentially interfering channels. Moreover, a different minimum may be used for on-going calls than for acquisition requests for new calls.

Figure 6:
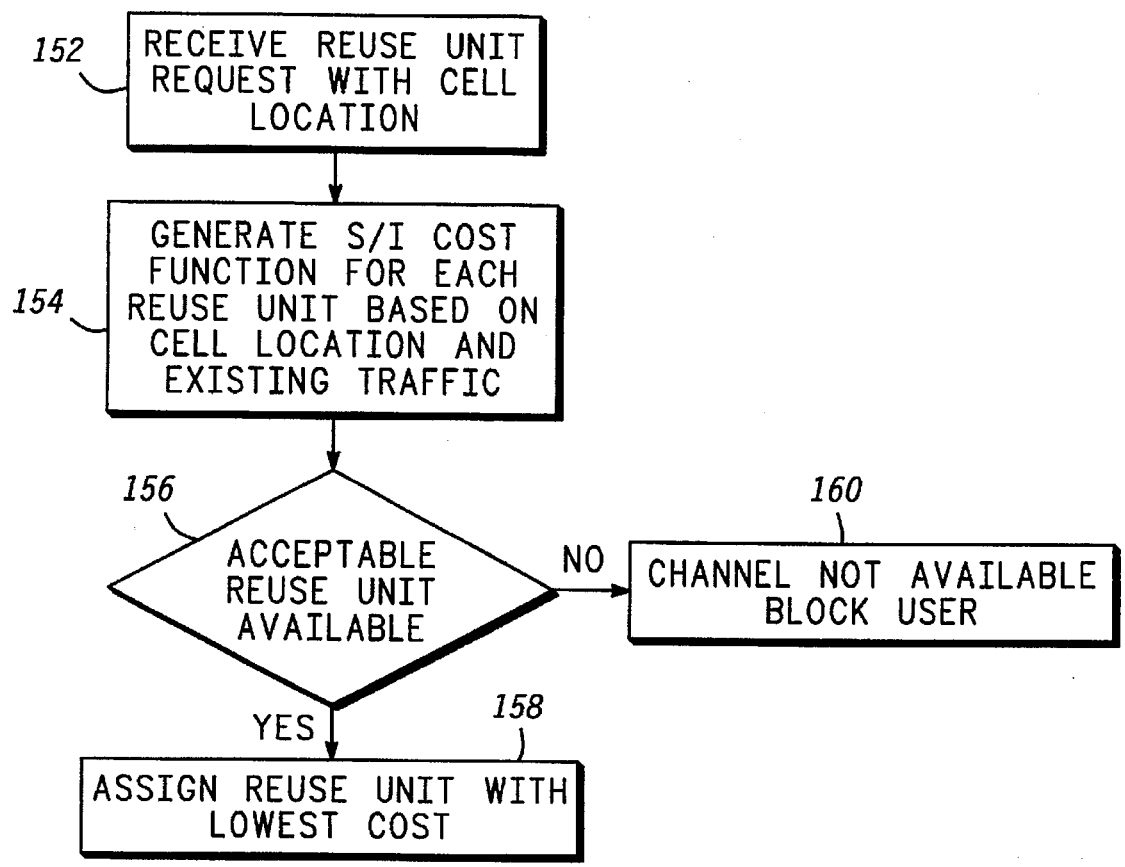
FIG. 6 shows a minimum interference cost method for reusing channels in accordance with a preferred embodiment of the present invention.

An alternative to the "maximum distance" iterative method is a minimum interference cost method 150 shown in FIG. 6. In this method 150, the channel space is searched one time and an interference cost is derived for each unused channel. At the end of the search, the lowest cost channel is assigned to the new user. Method 150 has the advantage of only requiring one search through the available channel space for each channel assignment. Method 150 also has a speed advantage in areas of heavy channel demand, but is slower for less congested areas.

As shown in FIG. 6, method 150 receives in step 152 a reuse unit request. Next, method 150 generates a signal-to-interference ratio (S/I) cost function for each reuse unit based on cell location and existing traffic. Method 150 may use an average signal-to-interference ratio (S/I) that would result if a particular channel were to be used in the new user's cell. This cost function could be computed a particular point such as the center of the cell. However, it is more effective to compute the average S/I for a number of points in the cell. Examples of points that could be used are a group of points evenly spaced around the cells perimeter or a grid of points that covers the overall area of the cell.

Alternative cost functions may be used for the interference cost method. For example, the components of the S/I calculation can be weighted so that particular interference sources (e.g., reuse channels, time slide, or frequency slide) are preferentially permitted or eliminated. Another function may use only the S/I due to the most powerful interference source as the cost. This increased the speed of the algorithm at the cost of some accuracy. Since the cost function is an average, it is possible (but not necessary) to condition the interference cost on the statistics of environmental factors such as differential fading.

As shown in FIG. 6, after method 150 generates the cost function for each reuse unit in step 154, method 150 determines in step 156 whether an acceptable reuse unit is available. If there is an acceptable reuse unit that is available, method 150 assigns in step 158 the reuse unit with lowest cost. Otherwise, method 150 determines that a channel is not available, so the subscriber unit is blocked in step 160.

An important variation to method 150 is to require a minimum cost before a channel is assigned. Another variation is to permit a channel assignment as soon as a low enough cost channel is found. This increases the speed of method 150.

An important point to consider in devising an adaptive reuse method based on an S/I cost function is that the interference paths may not be reciprocal. For example, in the situation in FIG. 2, subscriber unit A could interfere with subscriber unit B's channel, while subscriber unit B would not interfere with subscriber unit A's channel. This is common in LEO-based systems because the differential Doppler and propagation delay is seldom symmetrical between two users and two satellites. This lack of reciprocity becomes more pronounced in practical systems where a large number of interferers may combine to exceed the interference threshold of any particular user.

The lack of reciprocal interference can be incorporated into an adaptive reuse method as follows. When a new reuse unit is tested for admissibility, both the potential interference it might see and the potential interference it could cause to previously assigned reuse units is tested. The specific test depends on the particular cost function algorithm.

The adaptive reuse methods can be executed in real-time using the actual instantaneous system demand. This may, however, be impractical in some cases such as small satellites where computational power could be excessive. In addition, to be effective in a satellite system, the methods must be aware of the channel assignments in all other satellites where interference could occur. One solution is to generate channel assignments for each satellite in a central system control facility using predicted demand based on traffic history.

When the adaptive reuse method is used in a non-real time manner, the process proceeds as described above. The predicted demand is used in the adaptive reuse algorithm and a list of available channels are compiled for each satellite for each time interval. When the adaptive method is used, however, a cost index is included in the table for each channel at each time. When a satellite actually assigns a traffic channel, it always uses the lowest cost channel that is available.

It will be appreciated by those skilled in the art that the present invention allows for efficient managing and reusing a channels. The present invention reuses frequency and time assignments in different areas of system coverage to achieve efficient use of the available frequency spectrum. The adaptive nature of the methods maintains high capacity at the minimum interference level that can be achieved at that capacity.

The method described herein assigns channels to maintain efficient spectrum use and minimize interference through other paths.

In fixed reuse patterns, interference is higher than necessary for the required capacity. These methods match the interference level to the demand. When the system is lightly loaded, the interference is quite low. As the demand increases, the reuse is increased to provide more capacity at the cost of increased reuse.

Another advantage is since every channel assignment is based on minimizing its interference to all other channels simultaneously in use, the reuse pattern is optimized for the current user distribution.

Accordingly, it is intended by the appended claims to cover all modifications of the invention which fall within the true spirit and scope of the invention.

What is claimed is:

1. A method for managing and reusing channels in a telecommunication system, the method comprising the steps of:

(a) receiving a request from a user for a channel;

(b) restricting interference potential by controlling at least one of spacing between interfering channels, time slide, frequency slide and antenna pattern and by searching through all unused channels and checking the interference potential of each of the unused channels against all channels that are already assigned; and (c) assigning one of the unused channels with the lowest interference potential to the user.

2. A method as recited in claim 1, wherein step (b) comprises the step of terminating the search as soon as one of the unused channels which meets minimum interference criterion is found.

3. A method as recited in claim 1, wherein step (b) comprises the step of predicting interference from a combination of the unused channels.

4. A method for managing and reusing channels in a telecommunication system, the method comprising the steps of:

(a) receiving a request from a user for a channel;

(b) using at least one of spacing between interfering channels, time slide, frequency slide and antenna pattern to predict interference from a combination of the unused channels;

(c) searching through all unused channels and checking the interference potential of each of the unused channels against all channels that are already assigned; and (d) assigning one of the unused channels with the lowest interference potential to the user.

5. A method as recited in claim 1, wherein step (c) comprises the step of assigning one of the unused channels if it meets minimum interference criterion.

6. A method as recited in claim 1, further comprising the step of denying access to the telecommunication system if none of the unused channels meet minimum interference criterion.

7. A method for managing and reusing channels in a telecommunication system, the method comprising the steps of:

(a) receiving a request from a user for a channel;

(b) determining whether a channel for which all currently active channels that potentially interfere are beyond a distance from where the user is located;

(c) assigning the channel to the user if step (b) finds a channel that does not interfere with any of the currently active channels;

(d) reducing the distance by a predetermined amount;

(e) determining whether a channel for which all of the currently active channels that potentially interfere are beyond the reduced distance; and (f) assigning the channel to the user if step (e) finds a channel that does not interfere with any of the currently active channels.

8. A method as recited in claim 7, further comprising the steps of:

(g) repeating steps (d)–(f) until a channel is found that does not interfere with any of the currently active channels; and (h) blocking the user's access to the telecommunication system if a channel is not found that does not interfere with any of the currently active channels.

9. A method as recited in claim 7, further comprising the steps of:

(g) repeating steps (d)–(f) until a channel is found that does not interfere with any of the currently active channels or the reduced distance is at a minimum distance; and (h) blocking access of the user to the telecommunication system if a channel is not found that does not interfere with any of the currently active channels or the reduced distance is a minimum distance.

10. A method for managing and reusing channels in a telecommunication system, the method comprising the steps of:

(a) receiving a request from a user for a channel;

(b) determining whether a non-interfering channel exists based on at least one of propagation delays and Doppler shifts of a plurality of currently active channels and physical distance of the currently active channels from where the user is located; and (c) assigning the channel to the user if step (b) finds a channel that does not interfere with any of the currently active channels.

11. A method for managing and reusing channels in a telecommunication system, the method comprising the steps of:

(a) receiving a request from a user for a channel;

(b) determining whether a non-interfering channel exists based on at least one of propagation delays and Doppler shifts of currently active channels and a region of an exclusion zone; and (c) assigning the channel to the user if step (b) finds a channel that does not interfere with any of the currently active channels.

12. A method for managing and reusing channels in a telecommunication system, the method comprising the steps of:

(a) receiving a request from a user for a channel;

(b) determining whether a non-interfering channel exists based on at least one of propagation delays and Doppler shifts of a plurality of currently active channels and a region of an exclusion zone; and (c) assigning the channel to the user if step (b) finds a channel that does not interfere with any of the currently active channels.

13. A method for managing and reusing channels in a telecommunication system, the method comprising the steps of:

(a) receiving a request from a user for a channel;

(b) determining whether a non-interfering channel exists based on at least one of propagation delays and Doppler shifts of a plurality of currently active channels and a physical distance of the currently active channels from where the user is located;

(c) repeating step (b) until a channel is found that does not interfere with any of the currently active channels or the physical distance is reduced to a minimum distance;

(d) assigning the channel to the user if a channel that does not interfere with any of the currently active channels is found; and (e) blocking the user's access to the telecommunication system if a channel is not found that does not interfere with any of the currently active channels or the distance is reduced to a minimum distance.

14. A method for managing and reusing channels in a telecommunication system, the method comprising the steps of:

(a) receiving a request from a user located in a cell for a channel, wherein the request includes the cell's location;

(b) generating for each of a plurality of unused channels a cost of interference based on the cell's location and an average signal-to-interference ratio of a corresponding one of the unused channels used at various points in the cell; and (c) assigning one of the unused channels having the lowest cost of interference to the user.

15. A method as retired in claim 14, wherein step (c) comprises the step of assigning the one of the unused channels having an interference cost being equal to or greater than a minimum interference cost of interference.

16. A method for managing and reusing channels in a telecommunication system, the telecommunication system comprising a plurality of satellites and subscriber units, the method comprising the steps of:

(a) determining an anticipated demand for a duration of a planning interval;

(b) restricting interference potential by controlling at least one of spacing between interfering channels, time slide, frequency slide and antenna pattern and by searching through all unused channels and checking the interference potential of each of the unused channels against all channels that are already assigned;

(c) allocating one of the unused channels with the lowest interference potential to a cell within which demand is expected; and (d) propagating movement of the satellites, location of the subscriber units, and interference sources forward in time to create a preplanned allocation of channels with minimum interference potential.

* * * * *